United States Patent
Francsis

[11] Patent Number: 6,041,102
[45] Date of Patent: Mar. 21, 2000

[54] DATA-IMPRINTED DENTAL RADIOGRAPH DEVICE AND PROCESS

[76] Inventor: Kenneth M. Francsis, 975 E. Nerge Rd., Roselle, Ill. 60172

[21] Appl. No.: 09/057,241

[22] Filed: Apr. 8, 1998

[51] Int. Cl.⁷ ........................................... A61B 6/14
[52] U.S. Cl. ........................................... 378/165; 378/170
[58] Field of Search ........................... 378/165, 168, 378/169, 170; 269/41, 152, 238

[56] References Cited

U.S. PATENT DOCUMENTS

| | | | |
|---|---|---|---|
| 1,465,516 | 8/1923 | Hallenberg | 378/168 |
| 1,576,477 | 3/1926 | Wiens | 378/168 |
| 4,181,859 | 1/1980 | Vitalini | 250/476 |
| 4,251,732 | 2/1981 | Fried | 378/170 |
| 4,263,513 | 4/1981 | Palluet | 250/439 |
| 4,995,108 | 2/1991 | Tanaka | 378/168 |
| 5,034,974 | 7/1991 | Yurosko | 378/166 |
| 5,127,031 | 6/1992 | Yurosko | 378/166 |
| 5,166,967 | 11/1992 | Fabian | 378/168 |
| 5,202,911 | 4/1993 | Fabian | 378/168 |
| 5,256,982 | 10/1993 | Willis | 378/168 |
| 5,289,522 | 2/1994 | Kanbar et al. | 378/170 |
| 5,381,457 | 1/1995 | Burns | 378/166 |
| 5,509,805 | 4/1996 | Jagmin | 433/215 |
| 5,652,779 | 7/1997 | Levy et al. | 378/170 |

*Primary Examiner*—David P. Porta
*Assistant Examiner*—Drew A. Dunn
*Attorney, Agent, or Firm*—James P. Murphy

[57] ABSTRACT

An apparatus and process is provided for permanently imprinting historical data onto original dental radiographs by radiographically developing such information onto the film when initially developed. One preferred embodiment utilizes a pliers-like film holder with jaws to secure a radiographic film in place relative to a patient's teeth. The jaws have a slot to receive a removable marker which carries radio-opaque data to be permanently imprinted onto the radiograph. Another device includes a pronged film holder having a slot to receive such a removable marker. Processes for permanently imprinting dental radiographs, including the steps above recited, are also disclosed and claimed.

14 Claims, 5 Drawing Sheets

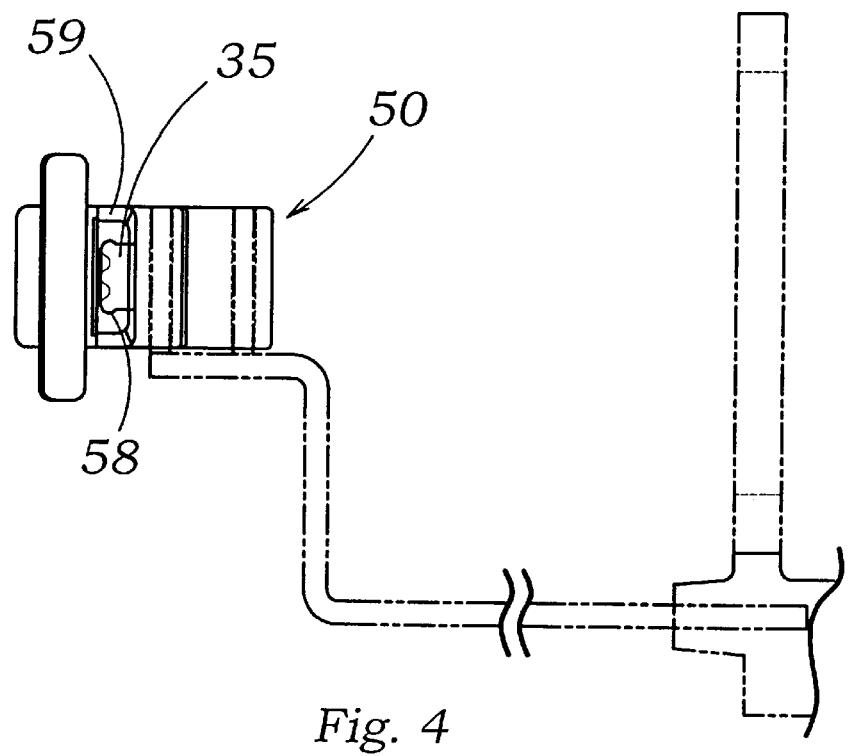
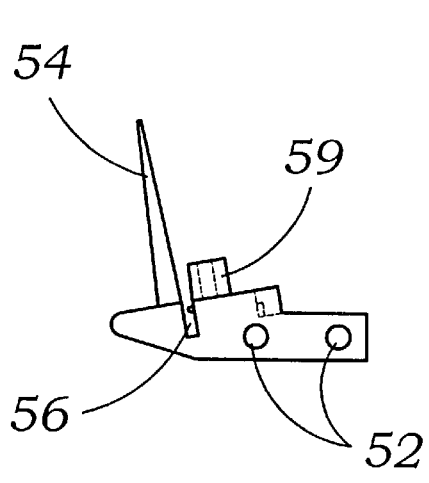
Fig. 4
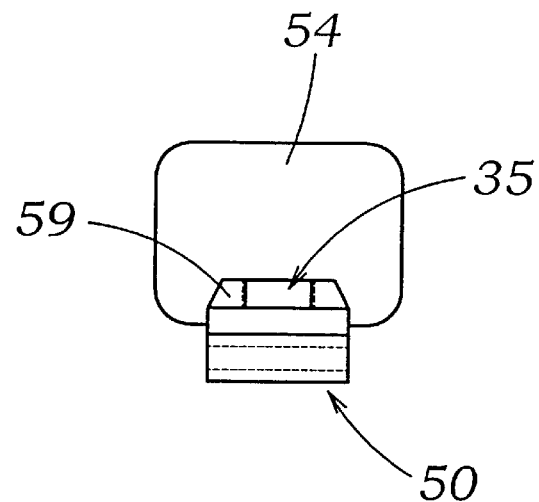
Fig. 5
Fig. 6

DATA-IMPRINTED DENTAL RADIOGRAPH DEVICE AND PROCESS

BACKGROUND OF THE INVENTION

The present invention relates to the placement of identification and other information on an original or initial dental x-ray film and, more particularly, to carriers and processes for placing information on dental radiographs.

Many different radiographic "x-ray" films and techniques are currently utilized to make radiographs to diagnose the condition of a patient's teeth. It is believed that most commonly, the dentist or dental assistant will place an x-ray film in position relative to the tooth to be radiographed using a tool called a holder or a positioner which secures the film intra-orally. See, for example, U.S. Pat. No. 5,652,779 to Levy. Based on the type and location of the tooth to be examined, different films, imaging techniques, film locations, and holders are used. In each case, however, a holder of some type will be employed to secure the film in relation to the subject tooth. Most often, a pliers-type holder is employed.

Examples of various film holders currently being sold are those made by Snap-A-Ray, Super-Dent®, Dentsply Rinn EEZEE-Grip, Uni-Bite, Hawe-Neos Kwik-Bite, Endo-Pro®, and Rinn XCP/BAI Position Indicating Device. Each is useful for holding radiographic x-ray film for dental radiography. U.S. Pat. No. 5,652,779 also describes a useful radiographic film holder device. In each case a film holder secures the film at the desired angle relative to the horizontal plane of the holder. When using a Paralleling Imaging Technique (XCP) the film would be 90 degrees to the horizontal of the holder which is concurrent with the central ray of the x-ray beam. The Bisecting Angle Imaging (BAI) technique would utilize an angle greater than 90 degrees which would depend on which teeth were being examined. The inclination may range from 95 degrees to 120 degrees. In both cases, a holder fixes a predesignated angle relative to the film and the central ray of the x-ray beam so as to minimize distortion of the image. A book entitled Roentgenographic Techniques, by Dan E. Tolman, D.D.S., provides a thorough description of dental radiographic techniques, and is expressly incorporated herein by reference.

A desirable feature of radiographs and film holders which is not presently known is the ability to permanently imprint variable patient data, dates, dental or other information on the radiograph at the time of exposure. Currently, it is not known how to variably imprint such radiographic film containing such information or how to conveniently place such information on a radiograph without disrupting the subject of the image or distortion of the data. As such, x-rays currently must be marked after development or processing. Without markings, these films may be kept in envelopes with identifying information or labeled with an adhesive label containing the necessary information, or the like. Each currently known means for identifying radiographs is unsatisfactory for permanent records. For instance, identifying the x-rays by placement in envelopes is not satisfactory because the radiograph can become separated from its corresponding envelope and mingled with other x-rays. Since there is no permanent identifying data on the film, cataloguing of the films may be lost forever. Labeling the x-ray is also generally unworkable because there is little excess space on most dental radiographs to affix a label and the labels may peel off. Dental radiographic film generally is used only in three sizes: #0, #1, and #2, with #2 being the largest at approximately 1¾" by 1¼". Thus, most radiographic film is only about two square inches or less. Thus, radiographically imprinting the film in a fixed and reliable method is highly desirable.

Information which would be helpful on a dental radiograph includes patient data to identify the patient, date of treatment, and other office information, for instance. No known method or device exists which allows a dentist to variably imprint the radiographic film with such information at the time of exposure and development. U.S. Pat. No. 4,181,859 to Vitalini describes the use of an adhesive attached to radiographic film using radio-opaque film, although directed to a different subject matter for other purposes, and offers no teaching of how to permanently imprint historical or variable data onto a dental radiograph. Such permanently data-imprinted radiographs would significantly increase the efficiency of analyzing patient histories, as well as general office administration. Further, insurance companies often request verification of services performed for insurance claims. Data-imprinted radiographs would eliminate mistakes and fraud being made by identifying or substituting the incorrect dental radiographs for the incorrect procedures, patients or dates.

SUMMARY OF THE INVENTION

Apparatus and procedures are provided whereby a dentist or dental x-ray technician can locate radio-opaque material in such relation to a patient's tooth to be examined and radiographic film such that predetermined data can be permanently, reliably and clearly developed onto the film at the time the radiograph is produced.

The present invention provides a radiographic film holder which allows a user to permanently imprint a radiograph with preselected identifying data for future reference and analysis. A holder secures a radiographic film in position relative to the longitudinal axis of the subject tooth or teeth and the central ray of the radiographic beam to make as x-ray picture, roentgenogram, or a radiograph of the subject tooth or teeth. The holder includes means for carrying a radio-opaque material comprising data in the form of letters, numbers or identifying symbols. The data is predetermined to include such information as patient name, file number, history, date, dental information or the like. The film is placed in the holder such that the radio-opaque material abuts the film at a location near an edge of the film. By keeping the radio-opaque material as close to the film as possible, the problems of distortion, enlargement, resolution and placement are negated or minimized. The data carrying means preferably includes a removable marker which can be inserted into a slot in the film holder. The marker may carry pre-printed data via a radio-opaque material or may include a surface which allows the user to write data onto it via a radio-opaque ink or the like.

The present invention also provides a process for utilizing a radiographic film holder to create a dental radiograph with variable, permanently encoded data. Through the process of the present invention, a radiographer selects the data to be encoded onto a dental radiograph, prepares a marker insertable into the holder having the desired data embossed or affixed to the marker in a radio-opaque medium, places the marker into the holder, inserts the x-ray film into the holder such that the data on the marker is in a desired position relative to the film, irradiates (or exposes) the film and processes the radiograph. Because the marker is reusable and removable from the holder, markers can be pre-embossed with permanent data for specific patients, teeth, dates, etc.

DESCRIPTION OF THE DRAWINGS

FIG. 4 is a top view of another preferred embodiment of the present invention.

FIG. 5 is a side view of the embodiment of the invention shown in FIG. 4.

FIG. 6 is a front view of the embodiment of the invention shown in FIGS. 4 and 5.

DETAILED DESCRIPTION OF THE PREFERRED EMBODIMENT

Dental radiographs are taken by placing radiographic film in such a location relative to the tooth or teeth of a patient to receive x-ray radiation from a source in front of the tooth or teeth. The purpose of radiography is to obtain diagnostic information of the teeth and their surrounding structures. Two basic techniques are generally employed: the paralleling technique and the bisecting-angle technique. With each technique, the x-ray source emits an x-ray beam through the teeth and surrounding structures directed towards the film. Any radio-opaque substance between the x-ray source and the film inhibits the x-ray beam from passing through, thus leaving as unexposed area of the film.

Figures 1, 1A:
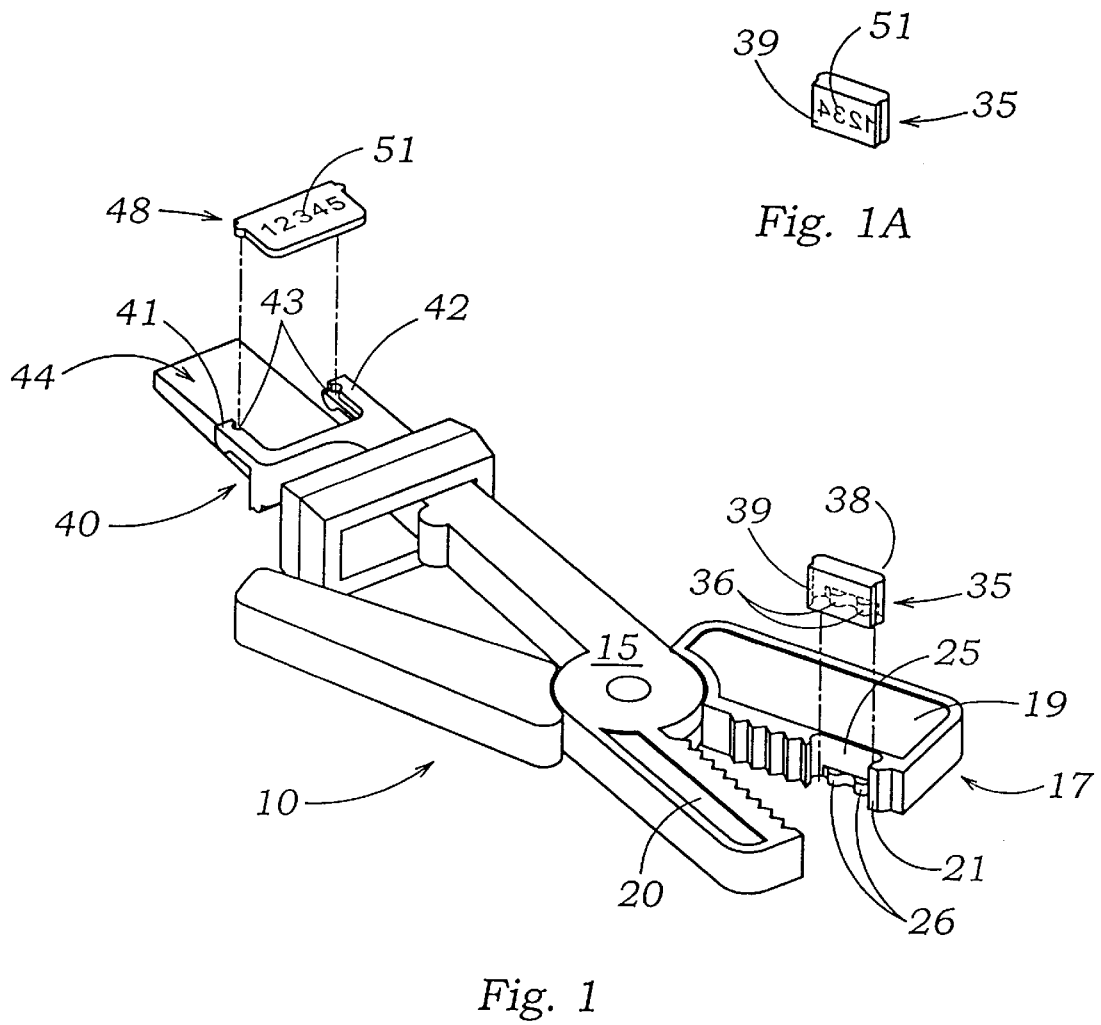
FIG. 1 is a perspective view of one preferred embodiment of the present invention.
FIG. 1A is a perspective view of the marker preferably used with embodiment of the invention shown in FIG. 1.

The present invention, designated generally 10 in FIG. 1, provides a dental x-ray film holder 15 which secures film 22 (shown in FIG. 2) to teeth (not shown). Holder 15 has a generally pliers-like configuration. At and substantially comprising the head portion 17, holder 15 has mating jaws 19, 20. Jaws 19, 20 work in a pliers-like fashion to clamp radiographic film to a surface. Mating surfaces of jaws 19, 20 hold the film. The larger jaw 19 of the head portion 17 is used as a bite plate for the teeth to secure the film intra-orally against the side of the tooth to be radiographed.

Figure 2:
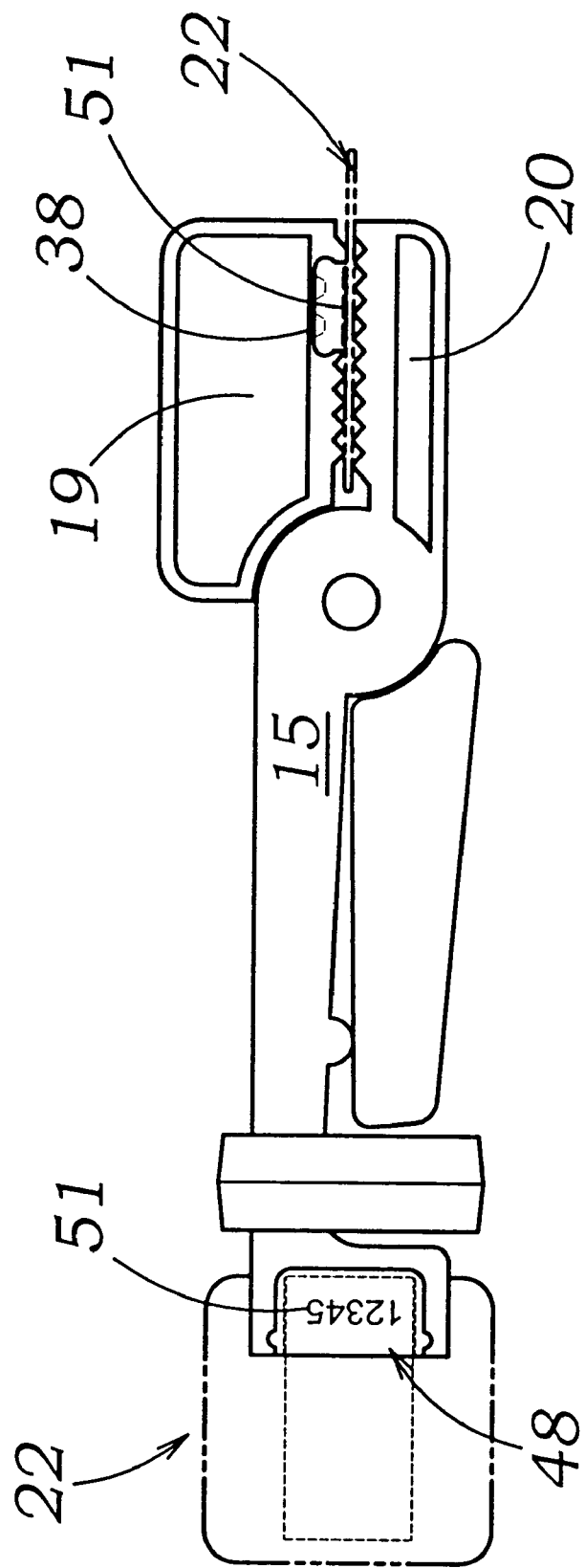
FIG. 2 is a top view of the holder with the marker of the embodiment of the invention shown in FIG. 1.
Figure 3:
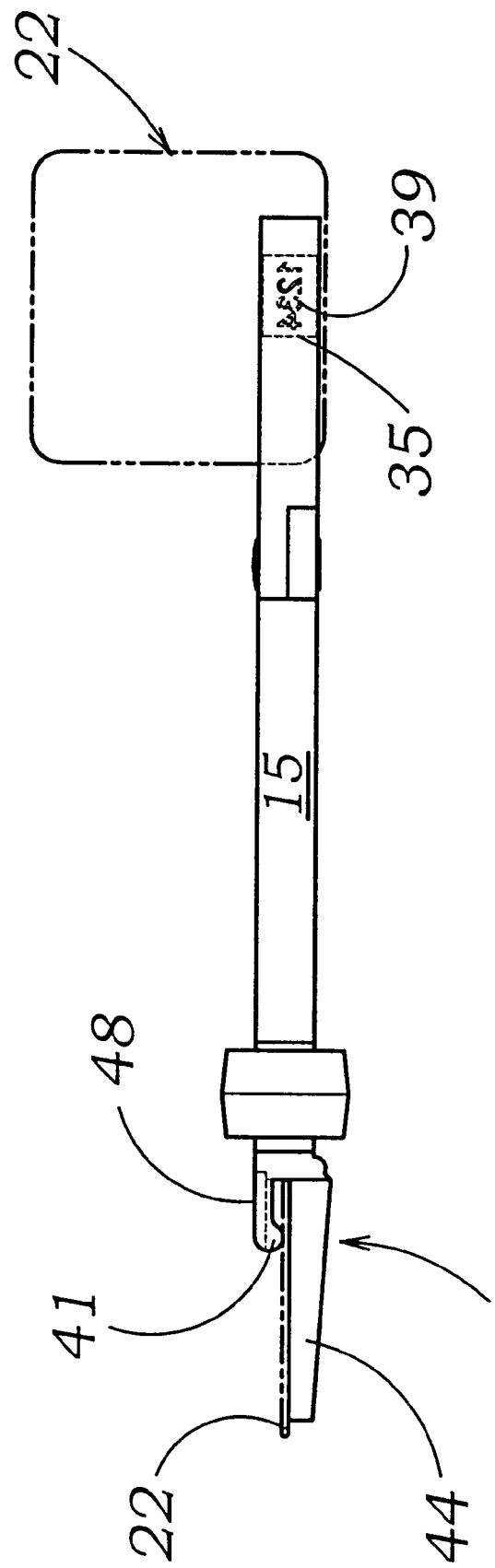
FIG. 3 is a side view of the embodiment of the present invention shown in FIGS. 1 and 2.

Within the body of jaw 19 of the holder 15, a slot 25 is cut to receive a marker 35. Marker 35 and slot 25 are designed such that marker 35 is matingly and securely received by slot 25, as shown in FIGS. 1, 1A and 2. Marker 35 has inner surface 38 and outer surface 39. Outer surface 39 of marker 35 is generally flush with surface 21 of jaw 19 or is a continuation thereof. As shown in FIG. 1, slot 25 has transversely extending tabs 26 for securing and stopping marker 35, and marker 35 has notches 36 to mate with tabs 26. Notches 36 and tabs 26 secure marker 35 within slot 25. The film holder sold by Snap-A-Ray is a preferred type of holder with this embodiment of the invention.

The holder 15 also includes a forked end 40 to receive and hold x-ray film 22 between three prongs 41, 42, and 44 as seen in FIGS. 1 and 2. In this type of holder, the invention utilizes a marker 48 insertable into a slot 43 formed between prongs 41 and 42. Film 22 is placed and held between prong 44 and a plane defined by prongs 41, 42. Marker 48 fits into slot 43 very similarly to marker 35 in slot 25 of jaw 19, as described above, and as shown in FIGS. 1 and 2. Radio-opaque material 51 is placed on marker 48 and/or 35 to permanently imprint the radiographic film with identifying data. Marker 35 is constructed of radiolucent plastic or nylon or the like and is compatible with the body of the holder 15. All materials must be biocompatible and insoluble in oral fluids and disinfecting solutions. Also, the materials need to withstand all conventional sterilization by means of heat, pressure and/or chemical methods as are well known to those of ordinary skill in the art.

In one preferred embodiment, outer surface 39 of the marker 35 can receive a radio-opaque material such as a dental restorative material such as alloy, composite, gutta-percha, or radio-opaque ink imprintable onto the surface of the marker 35. Any suitable dental composite material, or suitable non-composite such as gutta-percha, may be used. The user can score or rout a groove onto the outer surface 39 with the appropriate data (i.e. date, case number, symbols). The groove would be filled with or covered by the radio-opaque material. Then the user places the marker 35 into the slot 25 on the holder 15. The film 22 is secured between the jaws 19 and 20 to be placed intra-orally for exposure to the x-ray beam. When irradiated, the radio-opaque material inhibits the beam from reaching the film, thus permanently imprinting the film with the desired data with development of the film. In one preferred embodiment, markers can be permanently encoded with predetermined data, such as months and years, patent identification number, or the like, to be reused any number of times.

The term "dental composite material" is well known in the art and includes a distinct group of materials having known, desired characteristics. It is intended herein to mean any known or hereafter developed dental material useable intraorally which is radio-opaque. Some examples which are commercially available include MicroGlass Composite made by Heraeus Kulzer Charisma, and Z100 Restorative made by 3M. Many suitable materials are described in Ralph W. Phillips, M. S., D.Sc., *Skinner's Science of Dental Materials*, (W.B. Saunders Co. 1973), at p. 523, which is incorporated herein by reference. Any suitable non-composite material may also be used.

FIGS. 4 through 7 illustrate another preferred embodiment of the present invention. In FIGS. 4 through 7, an XCP or BAI type of device is shown, referred to generally as 50. As seen best in FIG. 5, holder 50 has apertures 52 to receive an alignment rod (not shown) used to align the holder or bite block appropriately relative to the teeth and the x-ray beam. Extending vertically near the back of holder 50 is film support 54. The radiographic film is inserted into a slot 56, which is substantially flush with the front plane of support 54. The film is thereby supported and positioned appropriately relative to holder 50 and support 54.

Figure 7:
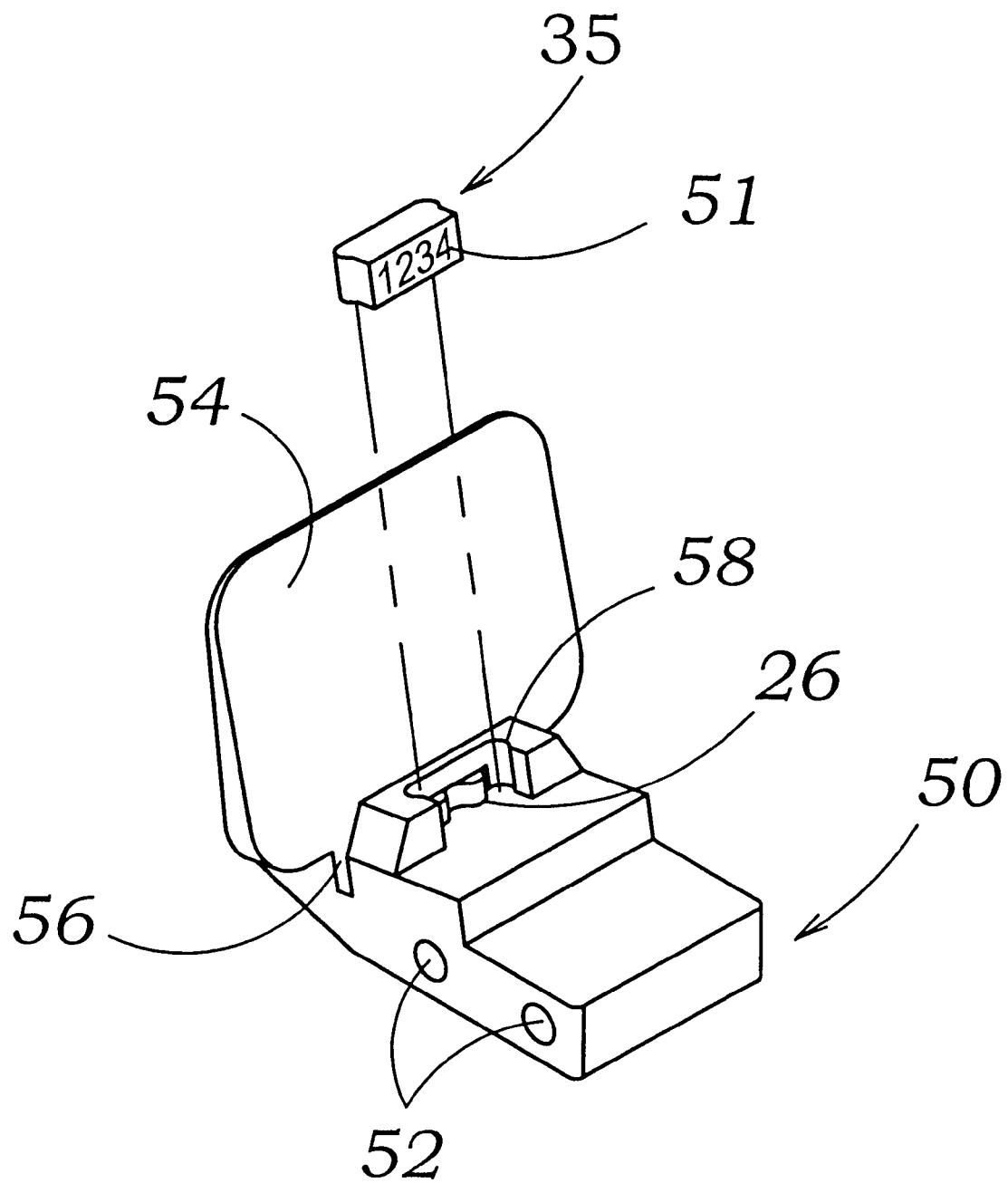
FIG. 7 is a perspective view of the embodiment of the invention shown in FIGS. 4, 5 and 6 showing the removed marker.

As seen best in FIGS. 6 and 7, a marker-receiving slot 58 is placed in holder 50 immediately in front of slot 56. Slot 58 has the same characteristics as described above such that marker 35 may be slidably, securely, replaceably inserted into slot 58. The data carried by marker 35, therefore, is placed in a position to permanently imprint the radiographic film when processed.

Of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

What is claimed is:

1. A device for permanently imprinting dental radiographs with variable, predetermined data comprising:
   means for temporarily and re-usably securing radiographic film intra-orally for examination of a tooth or teeth; and
   means adjustably and removably associated with the securing means for positioning radio-opaque data-carrying means in proximal relation to said film;
   whereby said film is permanently imprinted with said predetermined data.

2. The device of claim 1 wherein the data-carrying means is dental amalgam.

3. The device of claim 1 wherein the data-carrying means is a leaded foil.

4. The device of claim 1 wherein the data-carrying means is a dental composite material.

5. The device of claim 1 wherein the data-carrying means is gutta-percha.

6. A pliers-like device for permanently imprinting dental radiographs with variable, predetermined data, comprising
   a body portion including jaws to secure radiographic film in a specific relation to a tooth, and a grip portion to manipulate the jaws;
   a marker carrying predetermined data in a radio-opaque medium; and
   a slot in one of the jaws to removably receive the marker;
   such that a radiograph can be produced being permanently imprinted with the data carried by said marker.

7. The device of claim 6 wherein the slot further comprises at least one protruding tab and said marker includes a recess to mate with said tab to secure the marker in the slot.

8. A marker for use with a dental radiographic film holder comprising
   a body shaped to be removably received in a slot in the film holder; and
   a surface carrying variable, predetermined radio-opaque data;
   such that the marker surface is disposable sufficiently proximate a radiographic film to permanently, readably imprint the data onto the film when the film is processed.

9. The marker of claim 8 further comprising at least one indentation appropriately shaped to mate with at least one like-shaped tab protruding from said film holder.

10. A holder for marking dental radiographs having permanently imprinted data thereon, comprising:
    a body portion;
    at least two prongs extending from the body portion, to removably secure a radiographic film therebetween; and
    a slot formed in one of the at least two prongs for removably receiving a marker carrying predetermined data in a radio-opaque medium;
    such that a radiograph can be processed with permanently imprinted data thereon.

11. A process for creating a dental radiograph having permanently imprinted data comprising the steps of:
    1) selecting a tooth or teeth to be the subject of a radiograph;
    2) selecting a radiographic film from a plurality of film sizes;
    3) selecting a holder from a plurality of holder types for securing the film relative to the tooth or teeth;
    4) arranging the data to be imprinted onto the film;
    5) securing a marker carrying the data with the holder;
    6) exposing the film and tooth or teeth to x-ray radiation; and
    7) developing the radiograph to have the data permanently imprinted thereon.

12. The process of claim 11 further comprising the step of marking a plurality of reusable markers with desired predetermined data prior to securing the marker with the holder.

13. The process of claim 11 further comprising the step of placing the selected data onto the marker in a radio-opaque medium.

14. The process of claim 11 further comprising the step of choosing a marker having the selected data from a plurality of premarked markers.

* * * * *